United States Patent [19]
Takahara

[11] Patent Number: 6,011,769
[45] Date of Patent: Jan. 4, 2000

[54] OPTICAL INFORMATION RECORDING/ REPRODUCING APPARATUS WITH HIGH FREQUENCY IMPOSING CIRCUIT

[75] Inventor: Seishi Takahara, Chiba, Japan

[73] Assignee: TDK Corporation, Kanagawa, Japan

[21] Appl. No.: 08/973,396

[22] PCT Filed: Jul. 3, 1997

[86] PCT No.: PCT/JP97/02300

§ 371 Date: Dec. 11, 1997

§ 102(e) Date: Dec. 11, 1997

[30] Foreign Application Priority Data

Jul. 4, 1996 [JP] Japan .......................................... 175294
Aug. 28, 1996 [JP] Japan .......................................... 227044

[51] Int. Cl.[7] .......................................................... G11B 7/00
[52] U.S. Cl. ................................................ 369/121; 369/116
[58] Field of Search ........................................ 369/121, 116; 315/248, 39.51

[56] References Cited

U.S. PATENT DOCUMENTS 5,495,464  2/1996  Fujikawa et al. ........................ 369/121

FOREIGN PATENT DOCUMENTS

| | | |
|---|---|---|
| 403203044 | 9/1991 | Japan . |
| 3-227585 | 10/1991 | Japan . |
| 5-136501 | 6/1993 | Japan . |
| 406290475 | 10/1994 | Japan . |
| 7-105561 | 4/1995 | Japan . |
| 408171738 | 7/1996 | Japan . |

*Primary Examiner*—Thang V Tran
*Attorney, Agent, or Firm*—Nikaido Marmelstein Murray & Oram LLP

[57] ABSTRACT

An optical information recording/reproducing apparatus having a laser light source driven through a high frequency imposing circuit comprises a high frequency imposing circuit, electrical terminals of said laser light source being enclosed by a conductive shield case, which is composed of a pair of half cases, each of half cases contacting with the other half case and having a wall which overlaps with a wall of the other half case, a capacitor being coupled between at least of of lead lines for external connection of said high frequency imposing circuit and said laser light source, and ground, a junction of said capacitor and said lead line locating close to a wall of said shield case, and said lead line for external connection being taken out of the shield case through a gap between overlapping walls of said two half cases.

11 Claims, 10 Drawing Sheets

Fig.8(a)
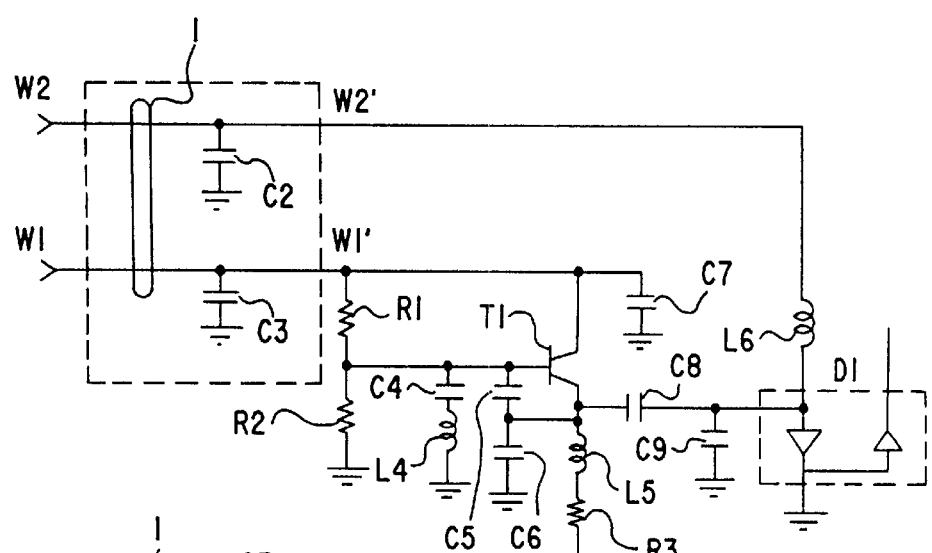
Fig.8(b)
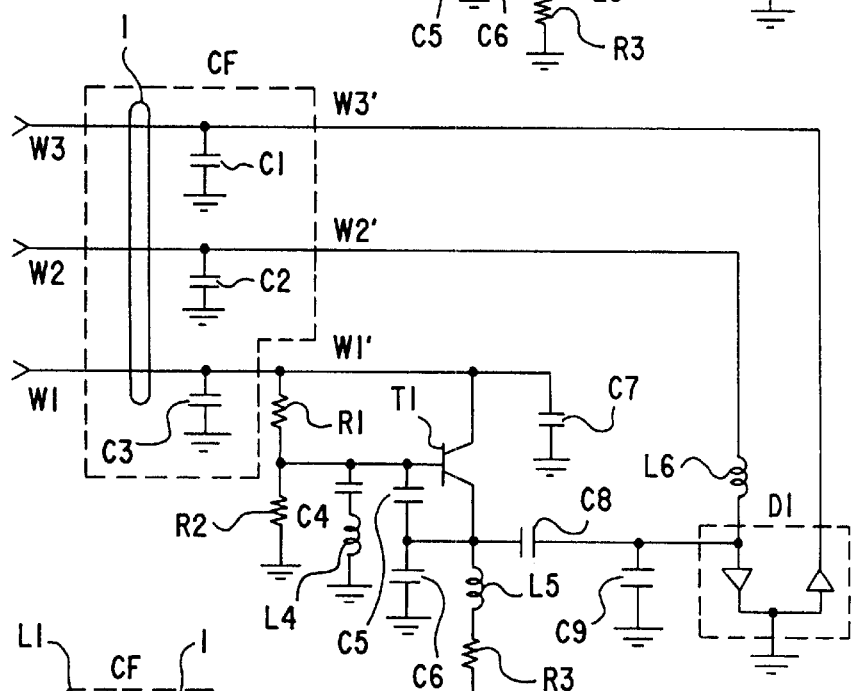
Fig.8(c)
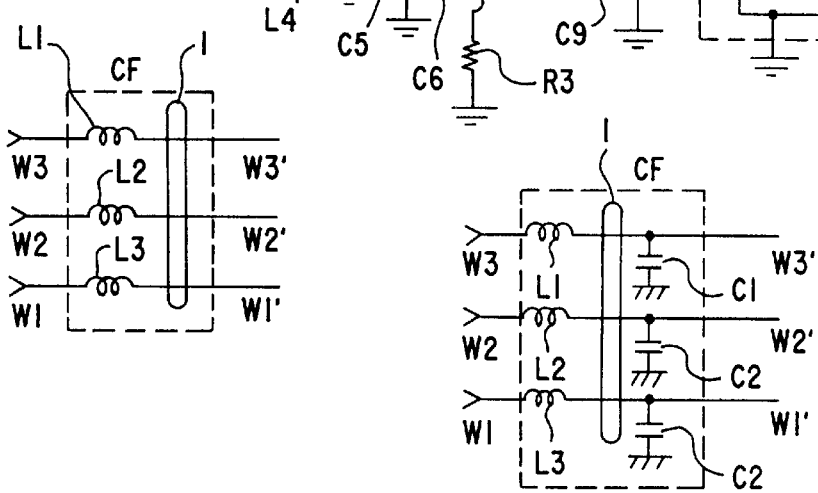
Fig.8(d)

OPTICAL INFORMATION RECORDING/ REPRODUCING APPARATUS WITH HIGH FREQUENCY IMPOSING CIRCUIT

TECHNICAL FIELD

The present invention relates to an optical information recording/reproducing apparatus having means for reducing undesirable radiation generated in a high frequency imposing circuit, in particular, relates to a noise protection apparatus in such an apparatus.

BACKGROUND OF THE INVENTION

In recording or reproducing operation of an optical information recording/reproducing apparatus, a high frequency imposing method in which a laser diode is driven by current imposed with high frequency current has been known for preventing laser noise which is induced by return light. The optical information recording/reproducing apparatus using high frequency imposing method, has a high frequency imposing circuit having an oscillator for switching ON/OFF a laser output light with frequency of several hundred MHz, so that vertical mode of laser beam is transformed to multi-mode, and generation of said laser noise is prevented (for instance, JP patent publication 9086/1984).

However, if oscillation frequency component of said high frequency imposing circuit is leaked into air, it is undesirable radiation (line noise, radiation noise). Therefore, the leakage should be prevented.

The radiation of undesired wave is classified to that through air space, and through coupling lines with external circuits. The former is prevented by enclosing an apparatus by conductive shield case, and the latter is prevented by a capacitor coupled between an external coupling line and ground.

FIG. 10 shows a prior optical recording/reproducing apparatus which prevents undesired radiation. In the optical recording/reproducing apparatus in FIG. 10, a portion mounting high frequency imposing circuit is sealed with a shield case 4 (conductive case).

Further, in the optical recording/reproducing apparatus, a laser diode 6 is engaged with an opening on an optical base 7, and the terminals of the laser diode are on substrate 5 for a high frequency imposing circuit, as shown in FIG. 11, which is a view in C-direction in FIG. 10 with a shield case taken off.

The external connection lines for power supply of the high frequency imposing circuit, power supply for a laser diode, and control signal of the high frequency imposing circuit are coupled with an external circuit through a respective through-hole capacitor 11 which engages with a shield case 4. Thus, the high frequency imposing circuit itself is sealed with a shield case, and the external connection lines are coupled with an external circuit through a through-hole capacitor 11, therefore, undesired radiation is prevented.

No radiation leaks through a gap between a through hole capacitor 11 and a shield case 4, by fixing the through hole capacitor to a hole provided on the shield case 4.

The through hole capacitors are coupled with a substrate 5 of a high frequency imposing circuit either through a flexible printed circuit 12 (FIG. 11(a)), or directly (FIG. 11(b)).

However, the prior optical recording/reproducing apparatus which has facility to prevent undesired radiation has the following problems which should be solved.

(1) As shown in FIG. 11, one terminal (a) of a through hole capacitor 11 must be connected to a substrate 5 of a high frequency imposing circuit either through a flexible printed circuit 12 for inner connection, or directly, and the other terminal (b) of the through hole capacitor 11 must be connected to the other flexible printed circuit 13 for external connection, therefore, the operation for mounting a through hole capacitor is complicated, and further it is difficult to reduce cost for components. Further, as a through hole capacitor occupies large area, therefore, it is difficult to reduce size of an optical recording/reproducing apparatus itself.

(2) As a shield case must have a hole for fixing a through hole capacitor, the producing steps of a shield case are complicated, and the assembling steps of the shield case are also complicated.

(3) It is preferable that external connection lines are taken out on one surface of a shield case, when we consider the wiring operation (easy wiring operation, efficiency of wiring operation et al). Therefore, holes for through hole capacitors for power supply of a high frequency imposing circuit, power supply for a laser diode, and control signal of the high frequency imposing circuit must locate on one surface of the shield case. However, this prevents to make small an optical recording/reproducing apparatus.

For instance, if a through hole capacitor is 2 mm$\phi$, (diameter of a through hole capacitor is 2 mm), the width Wc which a hole occupies is 2 mm as shown in FIG. 10. Assuming that the spacing Ws between the adjacent holes is 1 mm, and the width Wg for ground terminal is 2 mm, then, the total longitudinal length of a side surface of a shield case is around 11 mm. Further, the lateral length must be around 4 mm, assuming that 1 mm of margin is kept on both sides of a hole. Therefore, the area of a side surface of a shield case is 44 mm$^2$ (11 mm×4 mm).

However, as the latest optical recording/reproducing apparatus is small in size, it is almost impossible that a side wall of a high frequency imposing circuit has such a large area.

(4) A laser diode has usually another terminal line for back monitor reception for detecting optical laser output in the same package. When that line is connected to an external circuit, additional through hole capacitor must be installed, and it becomes further difficult to make small an optical recording/reproducing apparatus.

Although it is one of the options to reduce a number of components to make small an optical recording/reproducing apparatus, it is almost impossible to reduce a number of components while preventing deterioration of circuit characteristics. For instance, in a circuit for a high frequency imposing circuit shown in FIG. 12, it is impossible to reduce a number of components (components except for preventing undesired radiation) without deteriorating characteristics. In FIG. 12, D11 is a laser diode, C21, C22, and C23 are a through hole capacitor for preventing noise.

An object of the present invention is to provide an optical recording/reproducing apparatus in which it is easy to mount and assemble components for preventing undesired radiation in an optical recording/reproducing apparatus which has a high frequency imposing circuit, and the mounting space and the cost for those components are decreased.

SUMMARY OF THE INVENTION

The feature for implementing said object of the present invention comprises a laser light source for illuminating an information recording medium with laser light, an optical-electrical converter for providing electrical signal corresponding to information stored on said information recording medium by using reflection light from said information recording medium, and a high frequency imposing circuit for ON/OFF switching of said laser light, wherein said high frequency imposing circuit and electrical terminals of said laser light source are surrounded by a conductive shield case, which has a pair of half cases so that each of the half cases has a wall which contacts with and overlaps to a corresponding wall of another half case, a capacitor is provided between at least one of the external connection lines of said high frequency imposing circuit and said laser light source, and ground, a junction of said capacitor and an external connection line locates adjacent to a wall of said shield case, and an external connection line coupled with said capacitor goes out through a gap between a pair of respectively overlapping walls of said half cases.

Another feature of the present invention is an optical recording/reproducing apparatus comprising a laser light source for illuminating an information recording medium with laser light, an optical-electrical converter for providing electrical signal corresponding to information stored on said information recording medium by using reflection light from said information recording medium, and a high frequency imposing circuit for ON/OFF switching of said laser light, wherein said high frequency imposing circuit and electrical terminals of said laser light source are surrounded by a conductive shield case, which has a pair of half cases so that each of the half cases has a wall which contacts with and overlaps to a corresponding wall of another half case, an inductor is coupled in series with at least one of the external connection lines of said high frequency imposing circuit and said laser light source, and an external connection line coupled with said inductor goes out through a gap between a pair of respectively overlapping walls of said half cases, and connected to said inductor adjacent to a wall of said shield case.

Preferably, said external connection line is coupled with both of said capacitor and said inductor.

BRIEF DESCRIPTION OF THE DRAWINGS

FIG. 8 is a circuit diagram of a high frequency imposing circuit.

DESCRIPTION OF THE PREFERRED EMBODIMENTS

Figure 1:
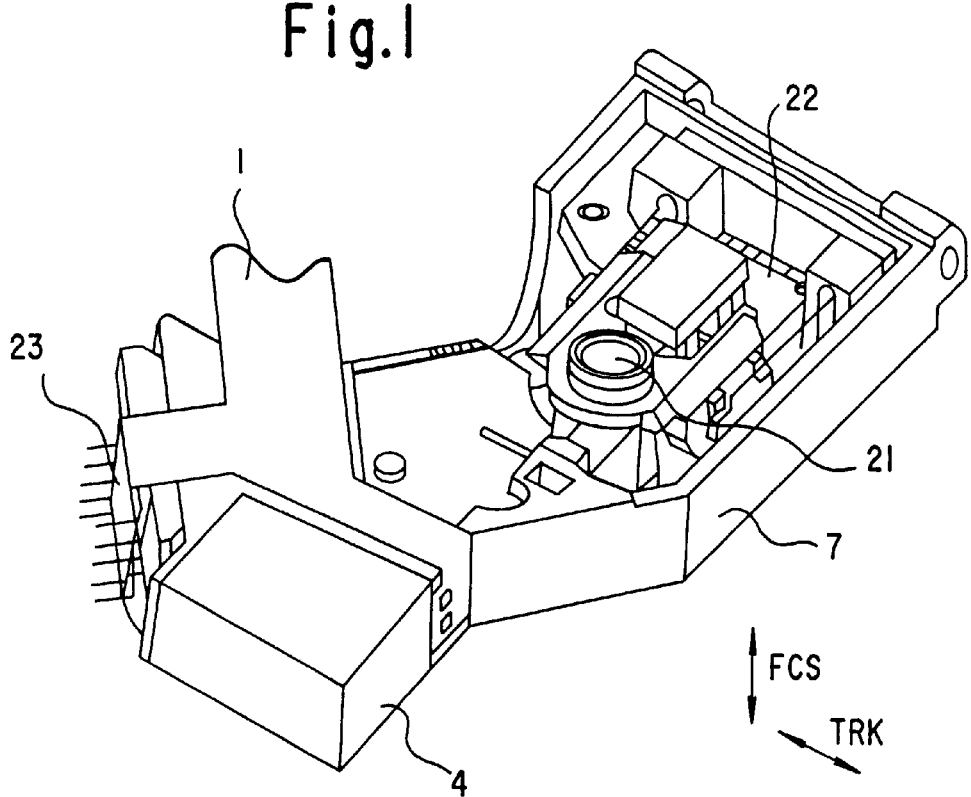
FIG. 1 is a perspective view of an optical recording/reproducing apparatus according to the present invention.

FIG. 1 shows a perspective view of an optical recording/reproducing apparatus according to the present invention.

The optical recording/reproducing apparatus has an optical base 7 which has a movable portion 22 having an object lens 21. The object lens 21 can move in focus direction FCS and in tracking direction TRK by supplying a coil (not shown) for actuating said movable portion 22.

The optical base 7 includes further a high frequency imposing circuit which includes a laser diode for outputting laser light, and a reception element 23 which converts optical signal detected in an optical disc to electrical signal. The power supply to those members and electrical signals are carried out through a flexible printed circuit 1. The high frequency imposing circuit is sealed by a shield case 4 so that undesired radiation is prevented to leak.

Figure 2:
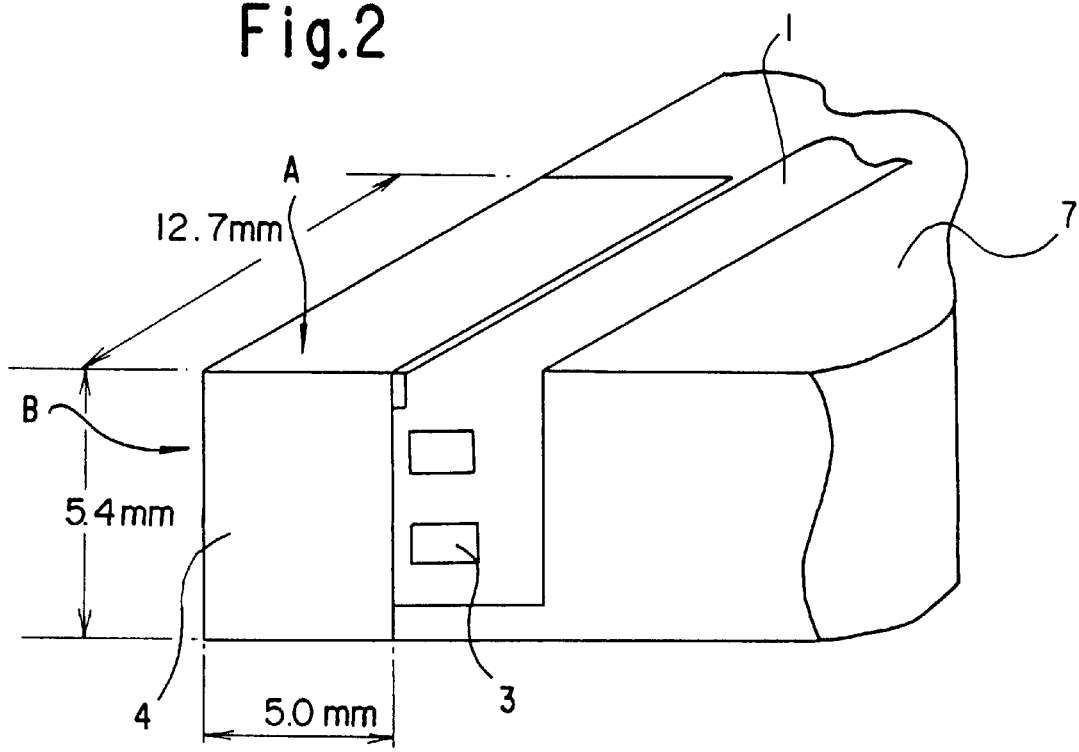
FIG. 2 is a perspective view of a part of said optical recording/reproducing apparatus, for mounting a high frequency imposing circuit.

FIG. 2 shows a high frequency imposing circuit and its peripheral portion. The high frequency imposing circuit is sealed by a shield case 4, and a flexible printed circuit 1 passes in a gap in the shield case.

Figure 3A:
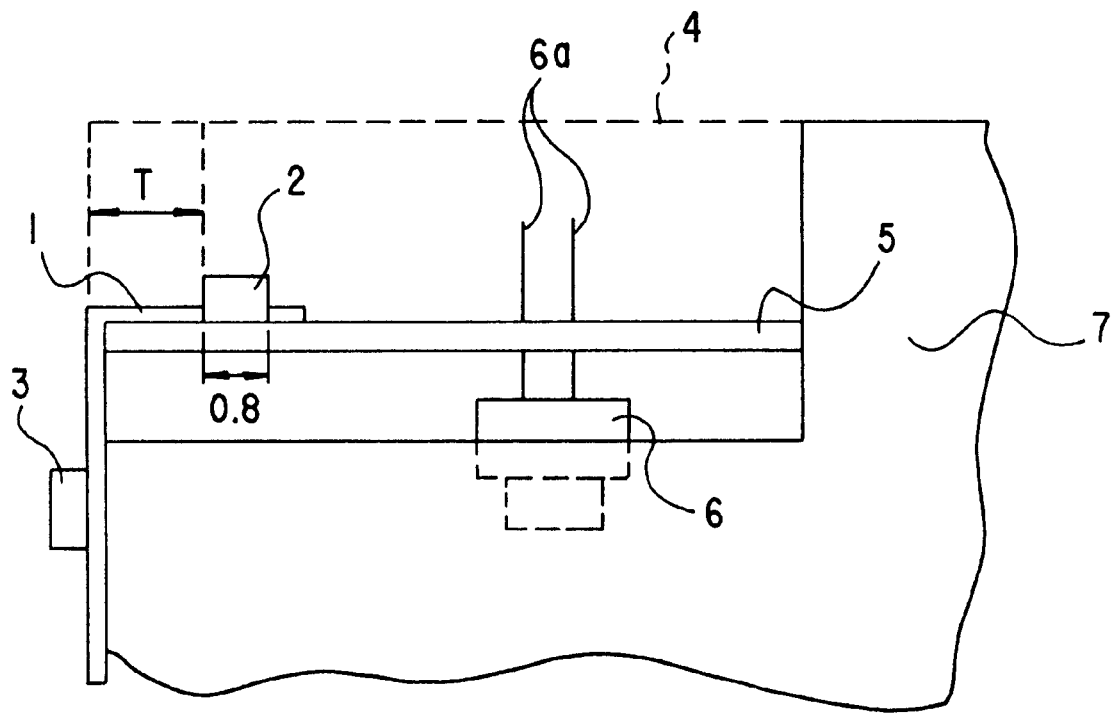
FIG. 3 is a general view (view in A-direction in FIG. 2) of the present invention.
Figure 3B:
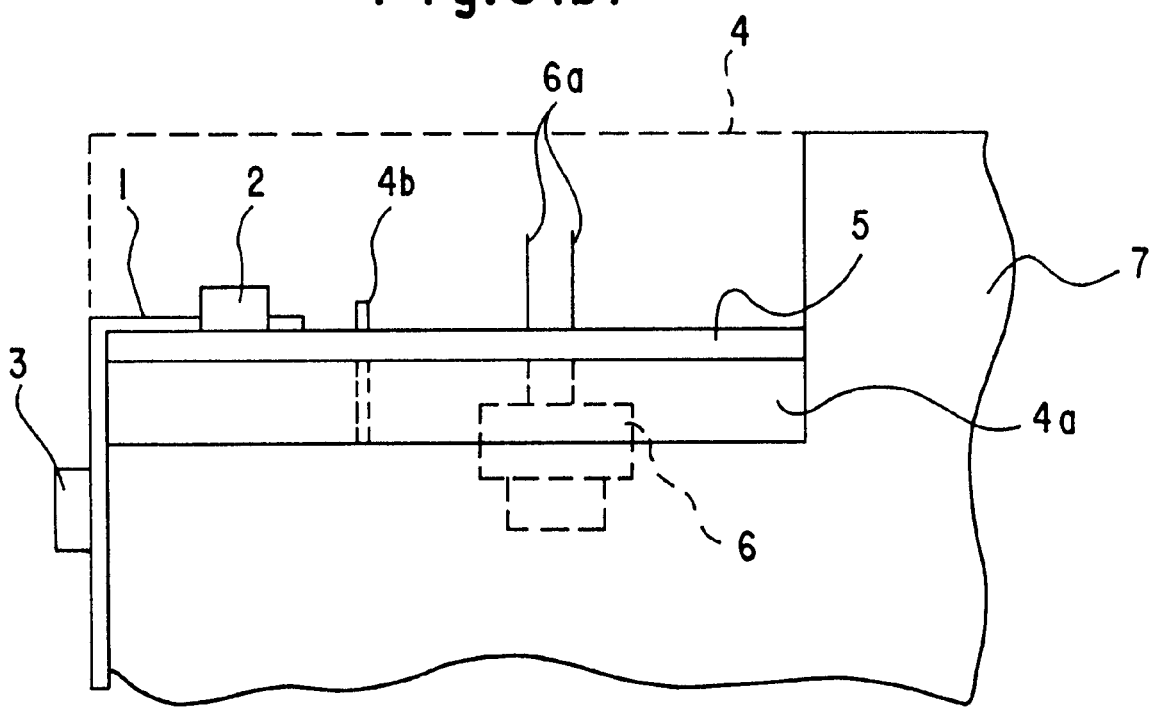
Figure 4A:
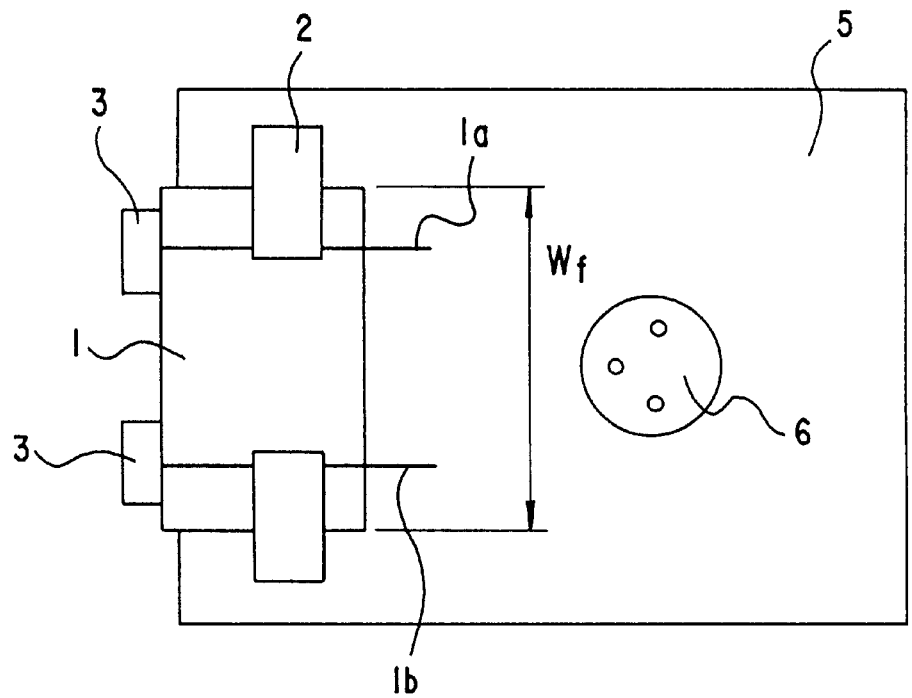
FIG. 4 is a general view (view in B-direction in FIG. 2) of the present invention.

FIG. 3 shows a view in A-direction in FIG. 2, and FIG. 4 shows a view in B-direction in FIG. 2. In those figures, a shield case and a circuit component (except for a component relating for preventing undesired radiation) are not shown.

Figure 5A:
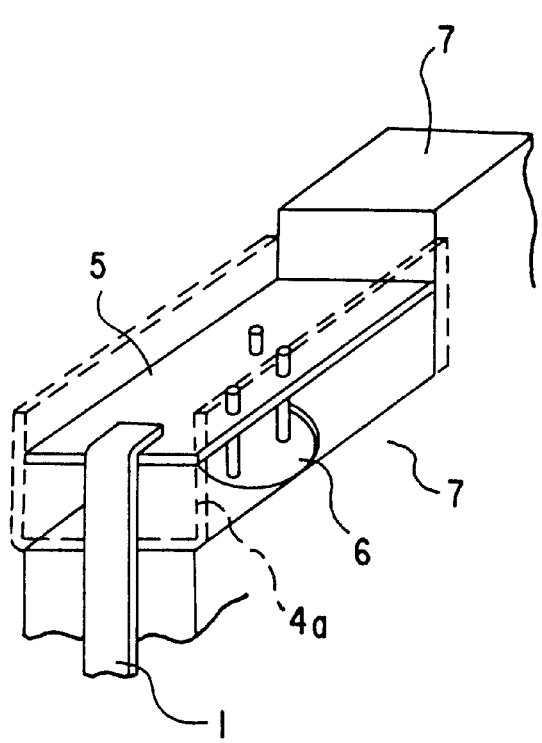
FIG. 5 shows a substrate 5 of a high frequency imposing circuit, and a pair of half cases 4, 4a, FIG. 6 shows an example of mounting using a double-faced substrate.
Figure 5B:
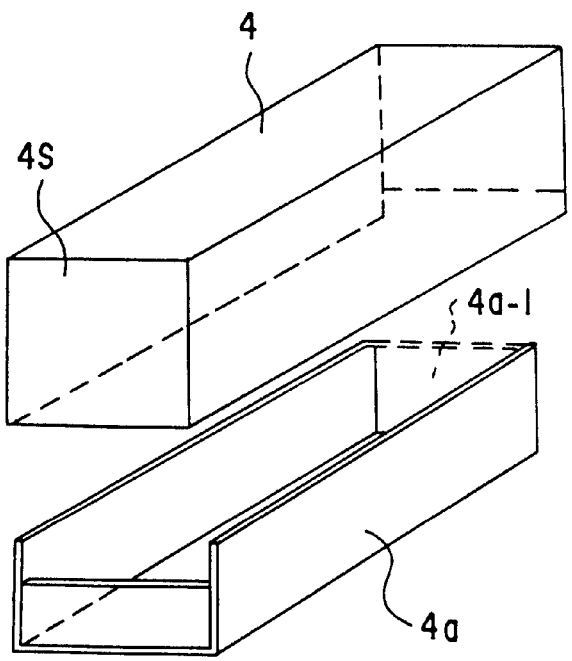
Figure 5C:
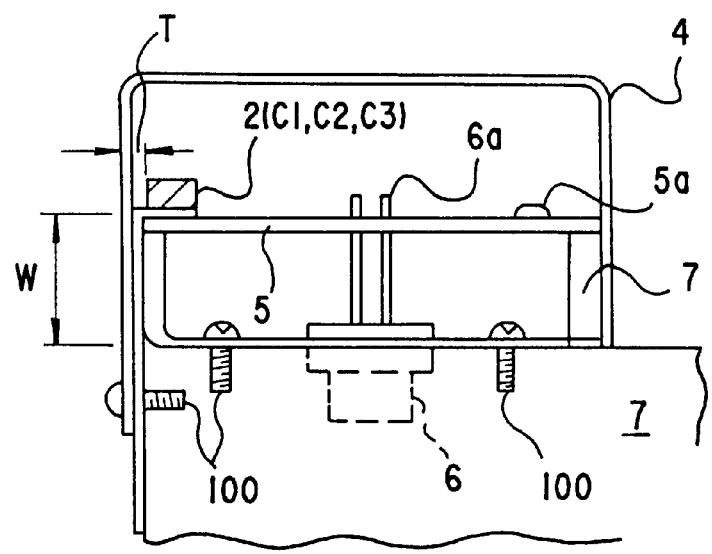

FIG. 5 shows in detail a high frequency imposing circuit substrate 5, and a shield case In FIG. 5, a laser diode 6 is engaged with a hole on an optical base 7, and a terminal 6a of the laser diode 6 is mounted on the substrate 5 of the high frequency imposing circuit.

The high frequency imposing circuit substrate 5 is coupled with a flexible printed circuit 1 which includes a line 1a for power supply to the high frequency imposing circuit and a line 1b for power supply to the laser diode.

In the present invention, capacitors, or inductors or both capacitors and inductors are used as a component for undesired radiation preventing means. A capacitor 2 is connected between a line and ground, and an inductor 3 is connected in series with a line.

Figure 4B:
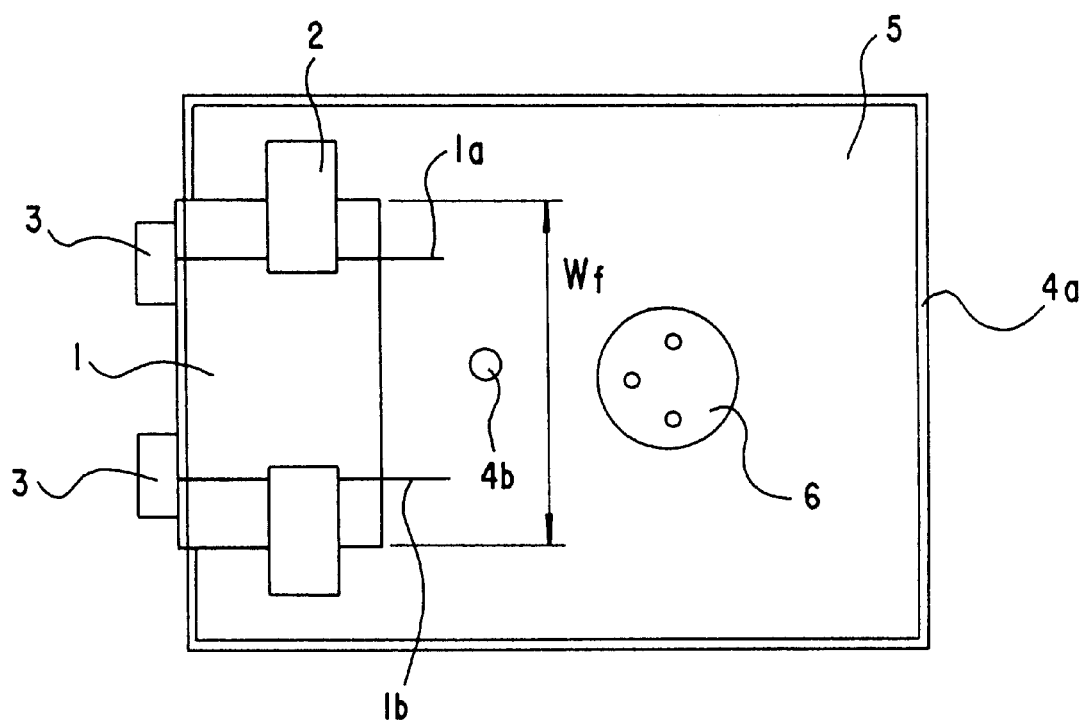

FIG. 3(b) and FIG. 4(b) show an inner shield case 4a which functions as a spacer or a supporting means for mounting a high frequency imposing circuit on an optical base 7, and a conductive pin 4b. The conductive spacer (supporting means) is electrically coupled with ground of the high frequency imposing circuit, and the optical base 7. The shield case 4 surrounding the high frequency imposing circuit is electrically coupled with the spacer and the optical base 7.

The shield case has a pair of half cases 4a, 4. A lower half case 4a is fixed to the optical base 7 by using a vis (screw), and supports the substrate of the high frequency imposing circuit. A ground pattern of the high frequency imposing circuit 5 is connected to a half case 4a by a solder 5a.

The lower half case 4a is essentially in parallelepiped shape with one plane 4a-1 facing with the optical base removed.

The upper half case 4 is essentially in parallelepiped shape, and covers the lower half case 4a so that the upper portion of the lower half case 4a and the lower portion of the upper half case 4 overlap with each other by length W. Preferably, the upper half case and the lower half case are fixed together by using at least one vis (screw) in the overlapped portion so that those half cases are mechanically fixed with each other, and are electrically coupled with each other.

It is supposed that a thin gap space is provided at the overlapped portion W between the upper half case and the lower half case so that a flexible printed circuit 1 may go through said gap space. The thickness of a flexible printed circuit is for instance around 0.2 mm. The frequency which we intend to prevent leakage is less than 2 GHz, which wavelength is much longer than length (0.2 mm) of the gap space. Therefore, no radiation leaks through the gap space between the half cases.

In one numerical embodiment, the size of a high frequency imposing circuit board 5 is 5.4 mm×12.7 mm, and the size of the end plane 4S of an upper shield case 4 is 5 mm×5.4 mm(=27 mm ). It would be impossible to mount three or four through hole capacitors on the end plane 4S in a prior art.

The electronic components shown in FIG. 8(*a*) or FIG. 8(*b*) are mounted on the high frequency imposing circuit substrate 5, which is coupled with an external circuit through lead lines W1, W2 and W3. The capacitors C1, C2 and C3 for noise suppression are connected between ground and the lead lines W1, W2 and W3, respectively, and preferably, inductors L1, L2 and L3 for noise suppression are inserted in series with the lines, respectively. A noise suppression capacitor C1, C2 or C3 is a surface mount component, or a chip capacitor, which is fixed on a substrate 5 by soldering both ends of the capacitor to the substrate. The capacitance of the capacitors is in the range between 50 pF and 1000 pF, and the size is for instance 1 mm×0.5 mm×0.55 mm, or 1.6 mm ×0.8 mm×0.9 mm. Those capacitors are mounted in the shield cases 4, 4*a*, and are coupled with an external circuit through a flexible printed circuit 1, and the inductors L1, L2 and L3 are inserted in series in the lead lines outside of the shield case 4 4*a*.

The noise suppression capacitors C1, C2 and C3 are fixed in the shield case 4, 4*a* adjacent to a wall of the shield case. The length T between a capacitor end which is connected to a flexible printed circuit for external connection, and the wall of the shield case is, preferably, less than 2 mm. In our experiment, the undesired radiation field radiated outside when T=2 mm, is improved by 19% as compared with the case when T=6 mm.

It is useful to fix the shield cases 4, 4*a* to the optical base 7 with a vis 100. In the experiment (T=2 mm), the undesired outside radiation when the shield case is fixed to the optical base 7 with a vis is halved as compared with that when no vis is used.

With the above structure, the present optical recording/reproducing apparatus prevents leakage of undesired outside radiation including radiation noise which is radiated into space by the high frequency imposing circuit, and line noise which is radiated through a line.

As for radiation noise (undesired radiation) radiated into space by the high frequency imposing circuit, the leakage into space is prevented by the shield case which encloses the high frequency imposing circuit.

In that case, the shield case and the optical base must be at ground potential in the frequency band of radiation noise to be prevented, that is to say, the oscillation frequency (300 MHz–600 MHz) of the high frequency imposing circuit which would generate the radiation noise.

In order to keep the shield case and the optical base at ground potential, the impedance (in particular inductance component) between the shield case and ground of the high frequency imposing circuit, and the impedance (in particular, inductance component) between the optical base and ground of the high frequency imposing circuit must be as small as possible.

However, in a prior optical recording/reproducing apparatus, connection between a shield case and ground of a high frequency imposing circuit, and between an optical base and ground of the high frequency imposing circuit is effected merely by a case of a laser diode. In that structure, the impedance between the shield case and ground of the high frequency imposing circuit, and the impedance between the optical base and ground of the high frequency imposing circuit are not small enough for preventing noise radiated into space.

On the other hand, according to the present invention, a high frequency imposing circuit is fixed to an optical base by using a conductive spacer including an inner shield case 4*a* and a conductive pin 4*b*, and further, ground of the high frequency imposing circuit is electrically coupled with the optical base through said spacer so that the impedance between the optical base and ground of the high frequency imposing circuit is small. Further, since the shield case is electrically connected to the spacer and the optical base, the impedance between the shield case and ground of the high frequency imposing circuit is also small.

It is preferable that ground of a high frequency imposing circuit is electrically connected to a spacer 4*b* with a solder, so that the impedance between the shield case and ground of the high frequency imposing circuit, and the impedance between the optical base and ground of the high frequency imposing circuit are small.

The shape of a conductive pin is not restricted to specific shape, and a number of a conductive pin 4*b* is not restriced. For instance, when a conductive pin 4*b* is used, a through hole with diameter around 0.6 mm is provided on a substrate of a high frequency imposing circuit so that a conductive pin is soldered to said through hole in order to electrically couple the optical base with ground of the high frequency imposing circuit, thus, the impedance between the shield case and ground of the high frequency imposing circuit, and the impedance between the optical base and ground of the high frequency imposing circuit are small. The electrical connection of ground of the high frequency imposing circuit to the optical base by using a conductive pin 4*b*, is advantageous to have small the impedance between the shield case and ground of the high frequency imposing circuit and the impedance between the optical base and ground of the high frequency imposing circuit merely by using area which is free but does not mount a component on the substrate.

As for line noise radiated through a line, it is prevented by a capacitor coupled between a line and ground, an inductor inserted in series in a line, and both of the capacitor and the inductor.

(Location of a Capacitor and an Inductor)

It is preferable that a terminal of a capacitor in line side is located closely adjacent to a shield case wall which a line penetrates. This structure prevents that radiation noise in a shield case is induced on a line between said shield case wall and the capacitor terminal, and leaks into external circuit as line noise.

As for a terminal of a capacitor in ground side, it is preferable that it is coupled to stable ground so that much line noise induced on a line is grounded. Therefore, it is preferable that a terminal of a capacitor in ground side is connected directly to a shield case which is connected to an optical base which is the most stable ground.

As for an inductor, it is preferable that it is connected, outside of a shield case, to a line closely adjacent to a shield case wall which the line penetrates. With that structure of an inductor, line noise does not leak out through a line. An inductor is located outside of a shield case because if an inductor is located in a shield case, it would be impossible to locate a capacitor close to a shield case wall. If an inductor is located far from a shield case wall, radiation noise would be radiated from a line between a shield case wall and an inductor, therefore, it is not preferable.

A capacitor and an inductor which function to suppress noise are not restricted to surface mount type, but when they are surface mount type, they may be mounted easier.

(Characteristics of a Capacitor and an Inductor)

Undesired radiation radiated by a high frequency imposing circuit includes frequency component of oscillation frequency of the high frequency imposing circuit, therefore, it is essential to solve the problem for oscillation frequency component in undesired radiation.

Therefore, it is preferable that a capacitor coupled between a line and ground has self resonant frequency close to oscillation frequency of the high frequency imposing circuit. It should be noted that impedance of a capacitor is small close to self oscillation frequency, and is the minimum at self resonant frequency, therefore, when the self resonant frequency is close to oscillation frequency of a high frequency imposing circuit, undesired radiation of oscillation frequency component is absorbed into ground through the capacitor.

As for an inductor inserted in series with a line, it is preferable that self resonant impedance of an inductor is close to oscillation frequency of a high frequency imposing circuit. It should be noted that impedance of an inductor is large when frequency is close to self resonant frequency, and is the maximum at self resonant frequency. Therefore, when self resonant frequency is close to oscillation frequency of a high frequency imposing circuit, undesired radiation of oscillation frequency component does not leak out through an inductor. Then, undesired radiation of oscillation frequency component is transferred to a capacitor which removes undesired radiation.

The suppression of undesired radiation is effective in particular to fundamental wave component, and up to 2 GHz. Generally, undesired radiation by harmonics is less than 10 dB (generally less than 20 dB) as compared with that of fundamental wave component, in particular, level of undesired radiation by harmonics higher than 2 GHz is very low. Therefore, that suppression characteristics up to 2 GHz have no practical problem.

(Line Out of a Shield Case)

A conductive line for external connection taken out of a shield case may be either a flexible printed circuit, or a flat cable. The conductive line is taken out through a gap between the overlap portion of a pair of half cases of a shield case which includes a high frequency imposing circuit, so that a line for power supply and a signal line coupled with the high frequency imposing circuit are taken out of the shield case with no leakage of radiation noise in the high frequency imposing circuit.

Further, as no hole for a through hole capacitor is necessary on a shield case, the manufacturing process of the shield case is simple, and the mounting operation of the shield case is also simple.

When a flexible printed circuit is used as a conductive line as shown in FIGS. 2 through 5, the flexible printed circuit has the width 2 mm, and the thickness 0.2 mm, so that the flexible printed circuit may be taken out through a gap of the overlap portion of a pair of half cases of the shield case. The gap of the shield case means a gap between half cases 4 and 4a, and a gap between a shield case 4 and an optical base 7.

The width of the gap of the shield case is enough for the thickness of a flexible printed circuit. That width of the gap is far smaller than wavelength of oscillation frequency of a high frequency imposing circuit, so that leakage of undesired radiation through the gap is neglected.

(Mounting of a High Frequency Circuit)

Figure 6A:
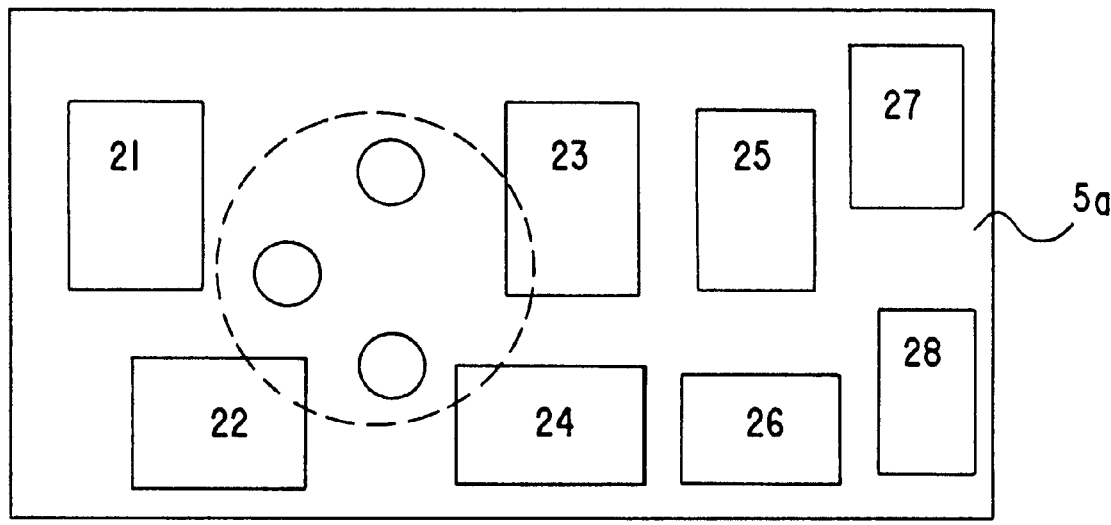
Figure 6B:
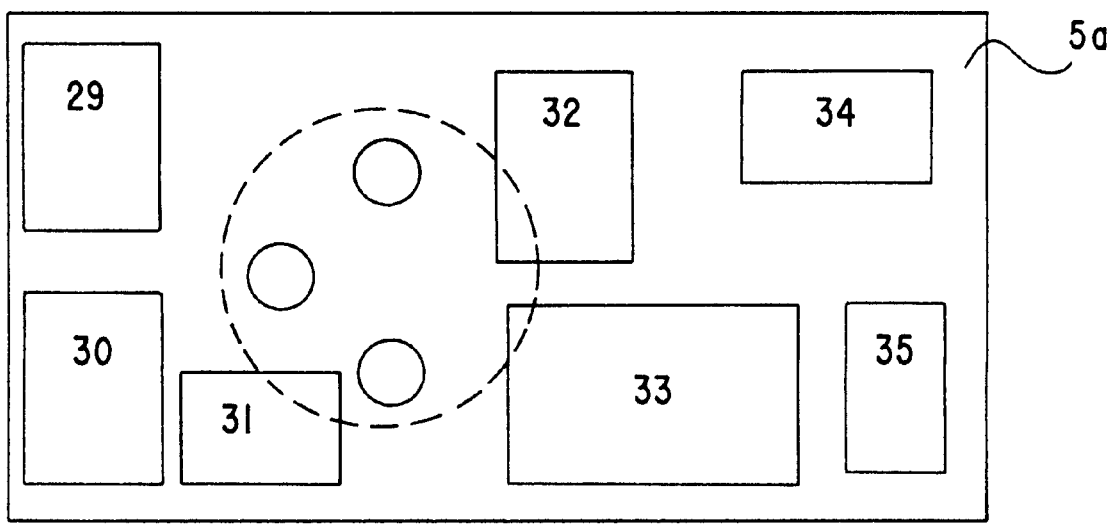

FIG. 6 shows mounting of a high frequency imposing circuit by using a double faced substrate, where FIG. 6(a) shows a first plane of the substrate, and FIG. 6(b) shows a second plane of the substrate. The double faced substrate 5a mounts resistors R1 through R3, capacitors C2 through C9, inductors L4 through L6, a semiconductor element T1, and a laser diode D1. The symbols in FIG. 8(a) correspond to those in FIG. 6 as follows.

R1; 34
R2; 35
R3; 29
C2; 21
C3; 22
C4; 28
C5; 26
C6; 25
C7; 32
C8; 24
C9; 23
L4; 27
L5; 30
L6; 31
T1; 33

Those components are mounted on either planes of the substrate, alternatively, a part of the components may be mounted in an inner layer of the substrate.

Figure 7A:
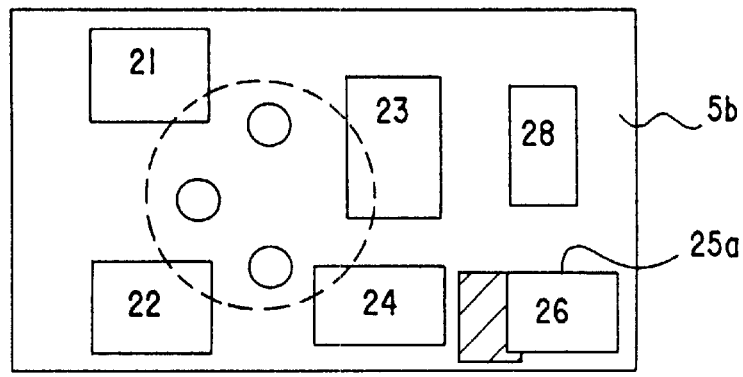
FIG. 7 shows mounting using a multi-layers substrate.
Figure 7B:
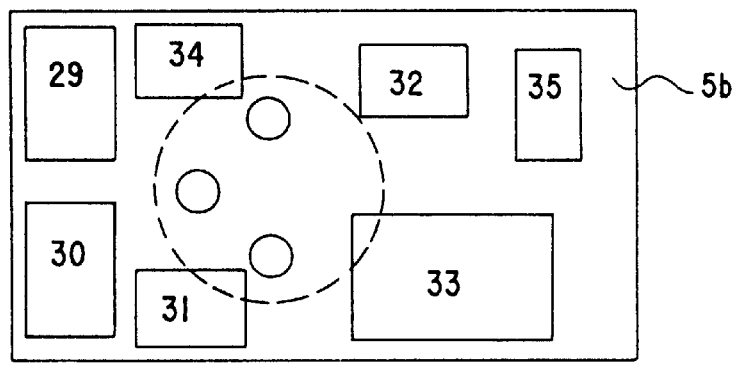
Figure 7C:
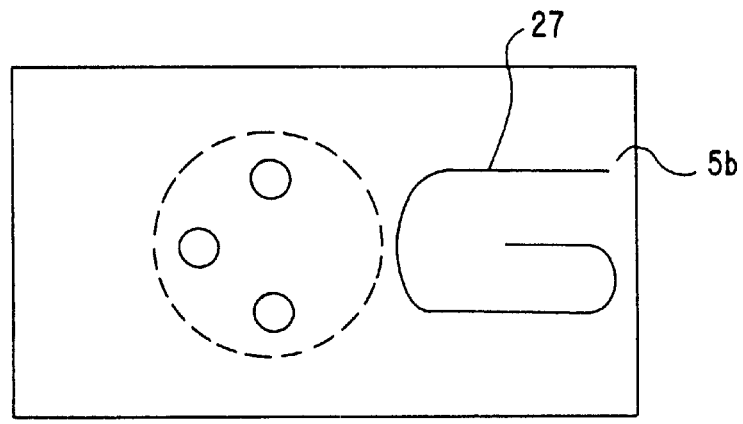
Figure 7D:
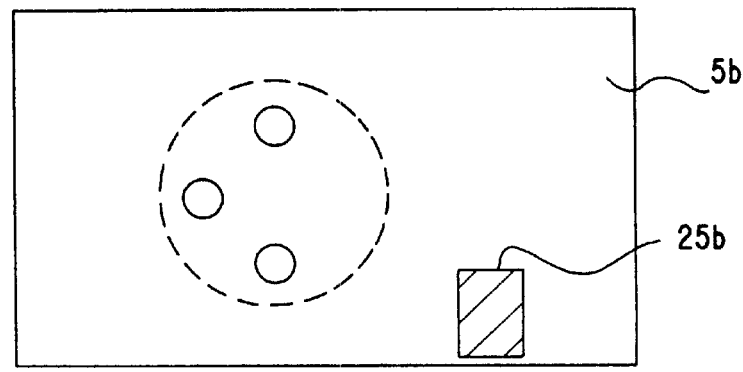

FIG. 7 shows an example of mounting, where FIG. 7(a) shows a first outer plane, FIG. 7(b) shows a second outer plane, FIG. 7(c) shows an inner plane (third plane), and FIG. 7(d) shows an inner plane (second plane). The capacitor C6 with an electrodes 25a and 25b is provided between the first outer plane and the inner plane (second plane), and the inductor L4 (27) is provided on the inner plane (third plane).

FIG. 8(a) shows a high frequency imposing circuit in which a back monitor reception terminal for measuring laser light output mounted in the same package as the laser diode D1, is not used. FIG. 8(b) shows another high frequency imposing circuit in which a back monitor reception terminal is connected to an external circuit. In that case, a signal line for a back monitor reception terminal must be mounted on a flexible printed circuit. Since the present invention uses a surface mounting component C1 instead of a through hole capacitor in a prior art, the mounting space for a signal line for front monitor reception element for measuring laser light output used in a prior high frequency imposing circuit, is removed.

In the embodiment of FIG. 7, the circuit components, capacitors and inductors, except those for preventing undesired radiation in a high frequency imposing circuit are mounted in an inner layer of a multi-layer substrate 5b. Alternatively, capacitor C1 through C3 which are for preventing undesired radiation are mounted in an inner layer of the multi-layer substrate 5b. In that case, the area occupied by the components for preventing undesired radiation is decreased.

Figure 9A:
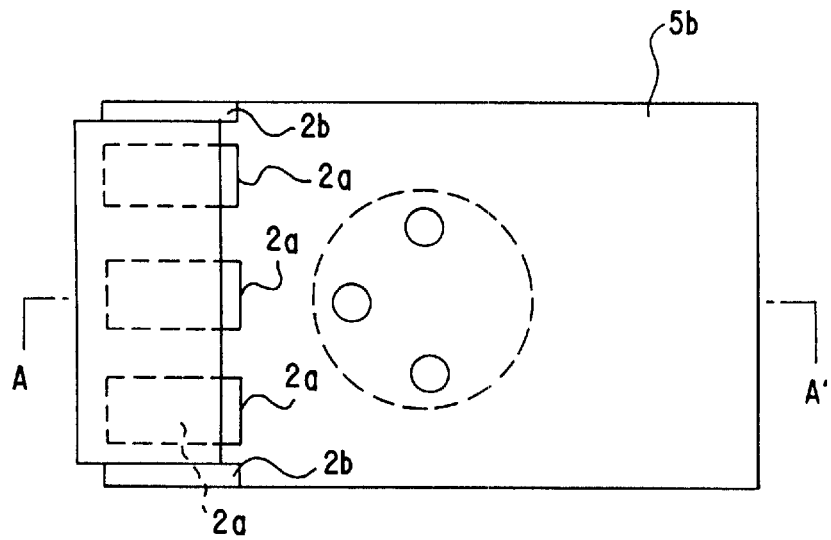
FIG. 9 shows a capacitor laminated in inner layers of a multi-layers (9 layers) substrate.
Figure 9B:
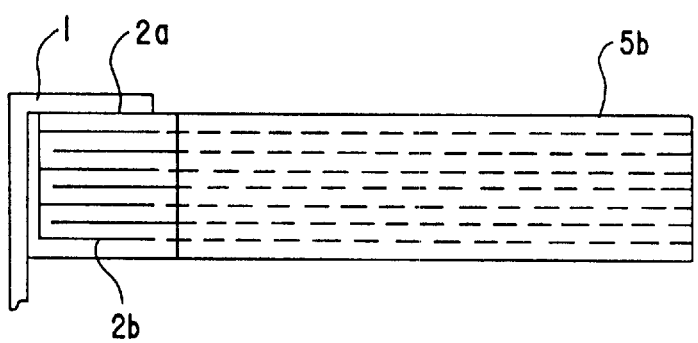
Figure 10:
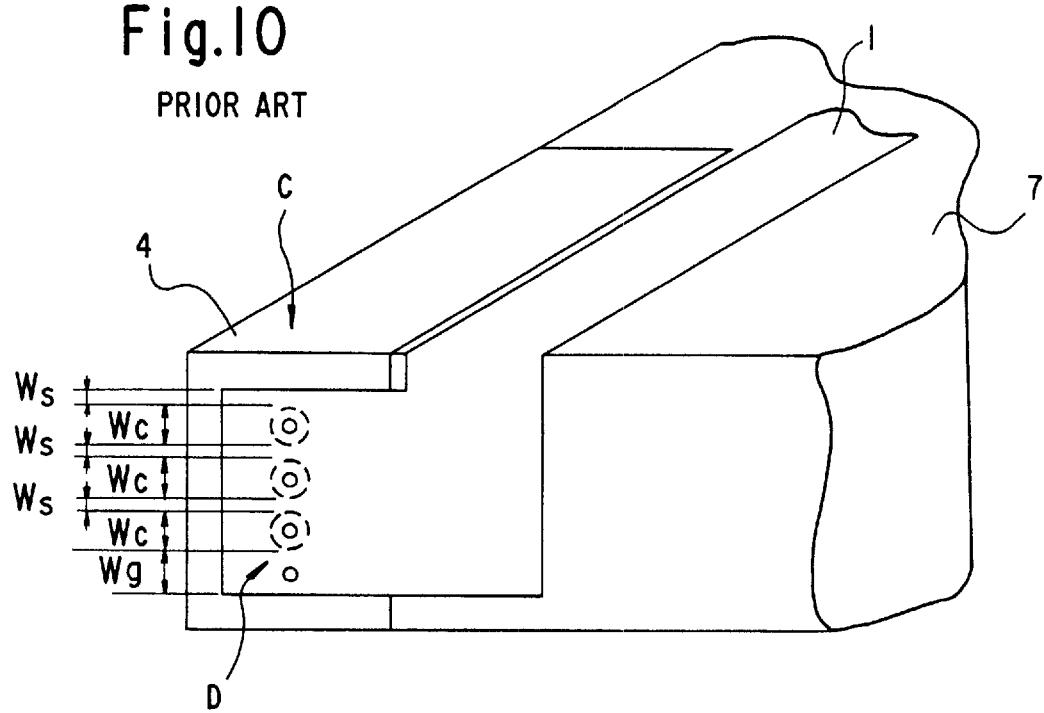
FIG. 10 is a high frequency imposing circuit in an optical recording/reproducing apparatus in a prior art.
Figure 11A:
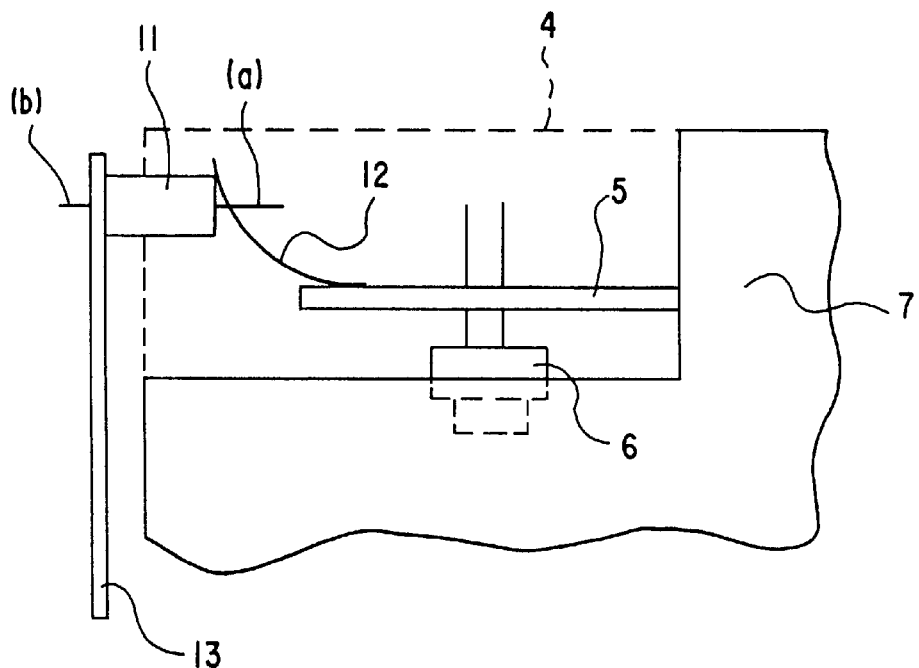
FIG. 11 is a general view (C-direction in FIG. 10) of an optical recording/reproducing apparatus in a prior art.
Figure 11B:
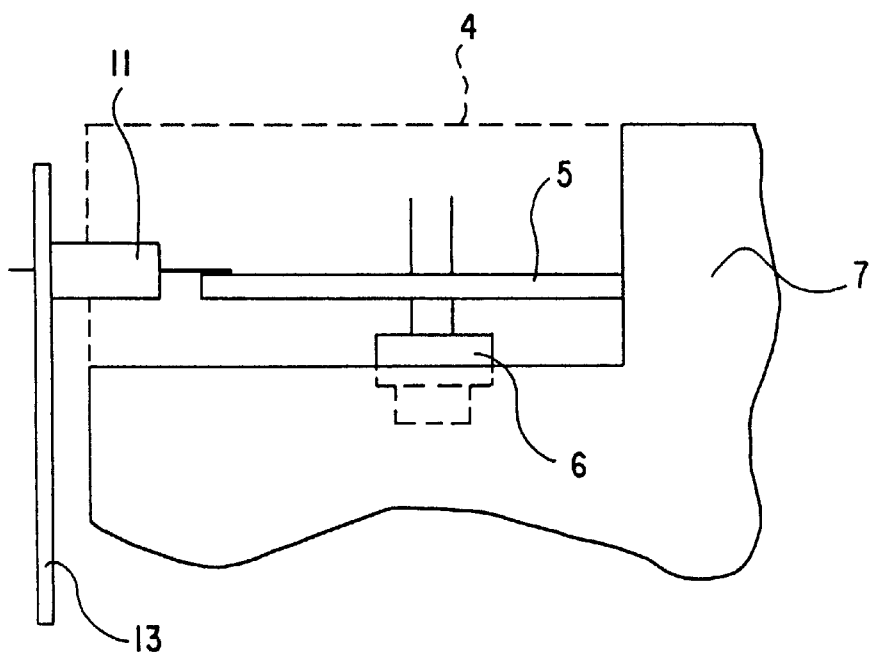
Figure 12:
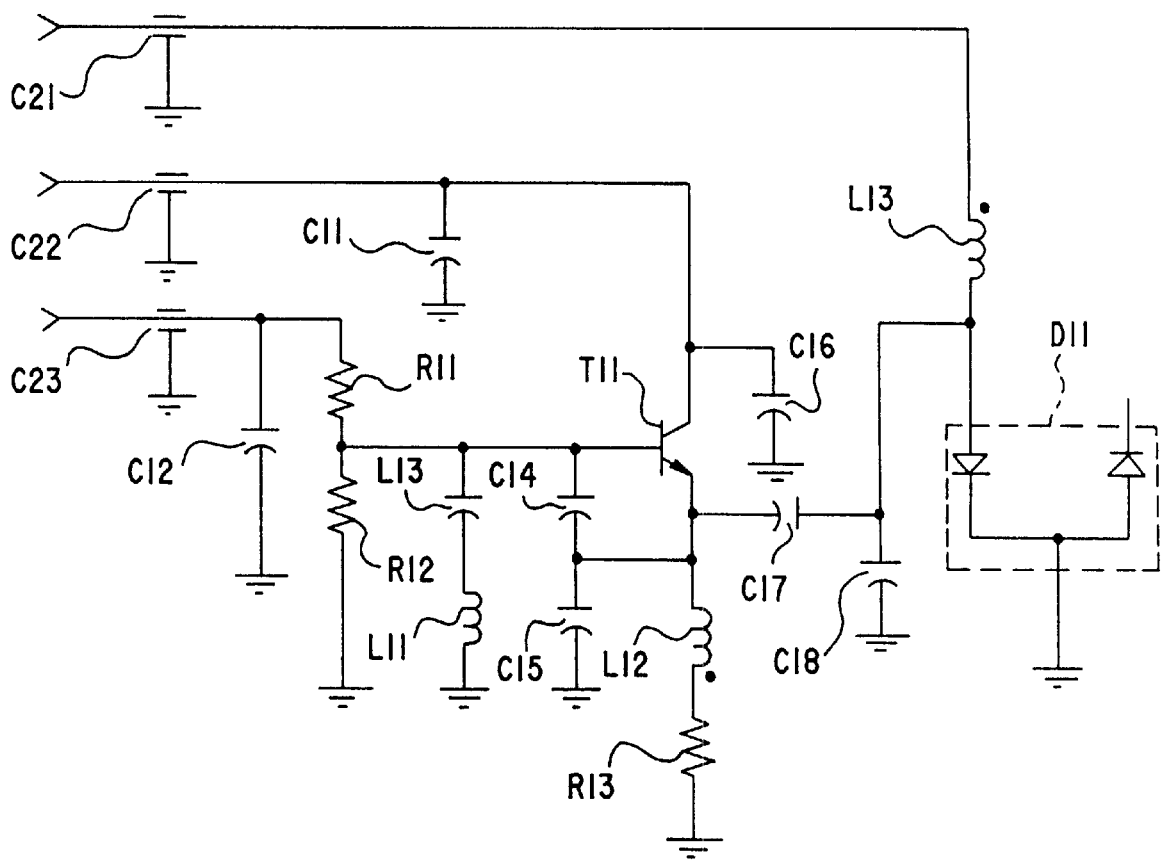
FIG. 12 shows an example of a high frequency imposing circuit which uses a through hole capacitor.

FIG. 9 shows the case of a multi-layer (9 layers) substrate 5b in which the capacitors C1 through C3 are provided in inner layers. In FIG. 9, (a) shows a plane view, and (b) shows a cross section at AA' of (a).

In FIG. 9, the multi-layer substrate 5b under the connection terminal of the flexible printed circuit 1 has inner layers which provide a pair of electrodes 2a and 2b for providing a capacitor. One electrode 2a is coupled with a line for power supply or a signal line, and the other electrode 2b is coupled with ground (for instance, it is soldered to a shield case 4).

A noise suppression circuit CF which is inserted in a lead line W1-W1', W2-W2', W3-W3' for external connection may include only capacitors, or only inductors, or both of capacitors and inductors. FIGS. 8(a) and 8(b) show an embodiment that only capacitors (C1, C2, C3) are used, where a lead line coupled with each capacitor is taken out by using a flexible printed circuit. FIG. 8(c) shows the case of only inductors (L1, L2, L3), and FIG. 8(d) shows the case of both capacitors (C1, C2, C3) and inductors (L1, L2, L3). A line taken out of a shield case is not restricted to said embodiment, but another line for power supply or signal line is possible. Further, components for circuit operation and components for preventing undesired radiation may be mounted on a surface plane or a rear plane.

(Effect of the Invention)

As described above, the present optical information recording/reproducing apparatus has the following effects. (1) The mounting and assembling process of the components for preventing undesired radiation is simple as compared with a prior art which a through hole capacitor is used. Further, the area occupied by those components is decreased. (2) The structure of a shield case is simplified as compared with that of a prior art which uses a through hole capacitor. Further, size of a shield case may be designed according to size of a substrate of a high frequency imposing circuit, but with no consideration of shape of a through hole capacitor. Then, the size of an optical recording/reproducing apparatus itself may be small. (3) A conductive line for external connection is taken out through a gap on the overlap portion of a shield case, and therefore, it is easy to take out a conductive line. (4) A capacitor and an inductor for preventing undesired radiation may be designed so that self oscillation frequency of the same is close to oscillation frequency of a high frequency imposing circuit, then, the effect for preventing undesired radiation is improved. (5) When a substrate for a high frequency imposing circuit has more than three layers, components for preventing undesired radiation may be mounted in an inner layer, then, area occupied by said components is decreased. (6) A number of lines taken out of a shield case may be increased without increasing area occupied by components for preventing undesired radiation. Therefore, additional line taken out of a shield case, for instance, a line for back monitor reception element, may be mounted easily.

(Applicability to Industry)

According to the present invention, undesired radiation from an electronics apparatus is prevented, and no disturbance to operation of medical apparatuses, and/or aerospace apparatuses is provided. Therefore, the applicable field of an optical information recording/reproducing apparatus is enlarged.

What is claimed is:

1. An optical information recording/reproducing apparatus comprising:
   a laser light source for illuminating an information recording medium with laser light;
   an optical-electrical converter for providing an electrical signal corresponding to information recorded on said recording medium by using reflection light by said recording medium; and
   a high frequency imposing circuit for switching ON and OFF said laser light, wherein
   said high frequency imposing circuit and a terminal of said laser light source are enclosed by a conductive shield case,
   said shield case has a pair of half cases each having a wall partially overlapping with a wall of the other half case,
   a capacitor is coupled between at least one lead line for coupling said high frequency imposing circuit and said laser light source with an external circuit, and ground,
   a junction of said capacitor and a lead line for external connection is located close to a wall of said shield case, and
   said lead line coupled with said capacitor for external connection is taken out of the shield case through a gap between the overlapped walls of two half cases.

2. An optical information recording/reproducing apparatus comprising:
   a laser light source for illuminating an information recording medium with laser light;
   an optical-electrical converter for providing an electrical signal corresponding to information recorded on said recording medium by using reflection light by said recording medium; and
   a high frequency imposing circuit for switching ON and OFF said laser light, wherein
   said high frequency imposing circuit and a terminal of said laser light source are enclosed by a conductive shield case,
   said shield case has a pair of half cases each having a wall partially overlapping with a wall of the other half case,
   an inductor is inserted in at least one lead line for external connection with said high frequency imposing circuit and said laser light source,
   said lead line coupled with an inductor for external connection is taken out of the shield case through a gap between the overlapped walls of two half cases, and
   a junction of said inductor and a lead line for external connection is located close to a wall of said shield case.

3. An optical information recording/reproducing apparatus according to claim 1, wherein an inductor is coupled in series with said lead line outside of said shield case.

4. An optical information recording/reproducing apparatus according to one of claims 1–3, wherein self oscillation frequency of at least one of said capacitor, said inductor, and both of said capacitor and said inductor is essentially the same as oscillation frequency of said high frequency imposing circuit.

5. An optical information recording/reproducing apparatus according to one of claims 1–3, wherein at least one of said capacitor, said inductor, and both of said capacitor and said inductor is a surface mounting component.

6. An optical information recording/reproducing apparatus according to one of claims 1–3, wherein a ground terminal of said capacitor is directly connected to said shield case.

7. An optical information recording/reproducing apparatus according to one of claims 1–3, wherein said capacitor is provided in an inner layer of a substrate which mounts said high frequency imposing circuit.

8. An optical information recording/reproducing apparatus according to one of claims 1–3, wherein said lead line is a flexible printed circuit.

9. An optical information recording/reproducing apparatus according to one of claims 1–3, wherein;
   a substrate (5) which mounts said high frequency imposing circuit is fixed to an optical base (7) through one (4a) of half cases,
   a ground pattern of said high frequency imposing circuit substrate (5) is electrically coupled with said half case, and
   said half case is electrically coupled with said optical base.

10. An optical information recording/reproducing apparatus according to one of claims 1–3, wherein length (L) of a lead line coupled with a capacitor is less than 2 mm in the shield case.

11. An optical information recording/reproducing apparatus according to claim 2, wherein said inductor locates outside of the shield case.

* * * * *

UNITED STATES PATENT AND TRADEMARK OFFICE
CERTIFICATE OF CORRECTION

PATENT NO. : 6,011,769
DATED : January 4, 2000
INVENTOR(S) : Takahara

It is certified that error appears in the above-identified patent and that said Letters Patent is hereby corrected as shown below:

Title page,
Item [73], please delete "Kanagawa, Japan", and insert therefor, -- Tokyo, Japan --

Signed and Sealed this

Second Day of October, 2001

Attest:

*Nicholas P. Godici*

NICHOLAS P. GODICI
*Attesting Officer*    *Acting Director of the United States Patent and Trademark Office*